(No Model.) 2 Sheets—Sheet 2.

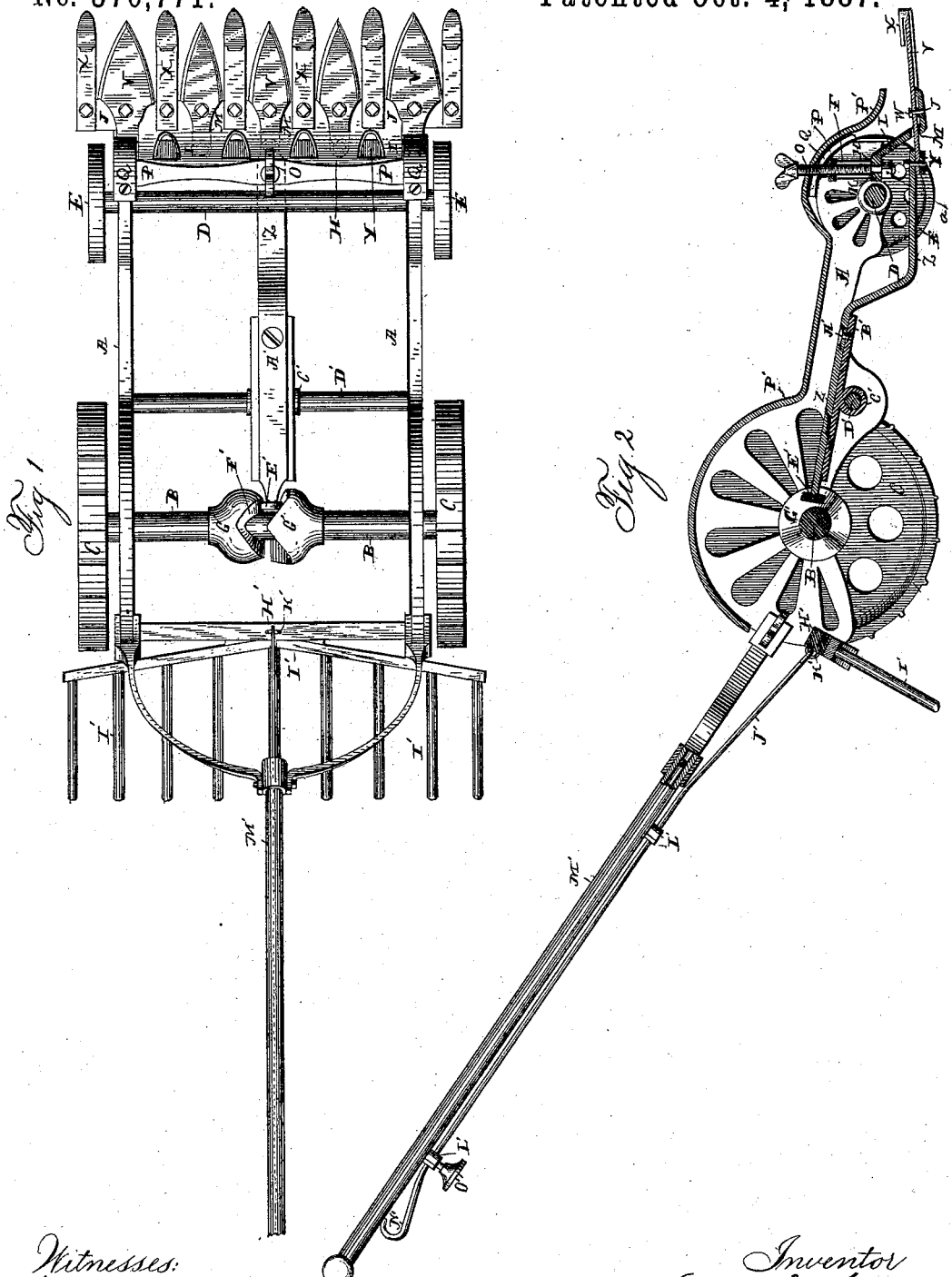

W. J. FITZGERALD.
LAWN MOWER.

No. 370,771. Patented Oct. 4, 1887.

Witnesses:
C. L. Swan Jr.
Edward H. Rogers

Inventor
William J. Fitzgerald
By Geo. D. Seymour
Atty.

UNITED STATES PATENT OFFICE.

WILLIAM J. FITZGERALD, OF NEW HAVEN, CONNECTICUT.

LAWN-MOWER.

SPECIFICATION forming part of Letters Patent No. 370,771, dated October 4, 1887.

Application filed March 8, 1886. Serial No. 194,397. (No model.)

*To all whom it may concern:*

Be it known that I, WILLIAM J. FITZGERALD, residing at New Haven, in the county of New Haven and State of Connecticut, have invented certain new and useful Improvements in Lawn-Mowers; and I do declare the following to be a full, clear, and exact description of the same, reference being had to the accompanying drawings, which form a part of this specification.

My invention relates to an improvement in lawn-mowers, the object being to produce a mower of simple, durable, and cheap construction, light weight, and easy and efficient operation.

With these ends in view my invention consists in a lawn-mower having a mower-frame, an independent vertically-adjustable cutter-carrying frame, a horizontally-operated cutting mechanism carried by such adjustable frame, a driving-cam, and an adjustable lever operated by such cam and actuating the cutting mechanism and made adjustable to conform to the vertical adjustment of the cutter-carrying frame.

My invention further consists in certain details of construction and combinations of parts, as will be hereinafter described, and pointed out in the claims.

Figure 3:
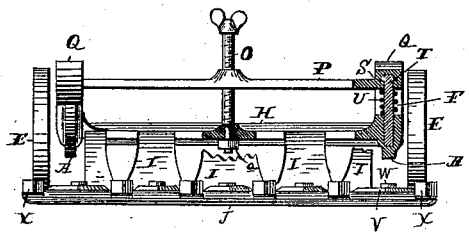
Figure 4:
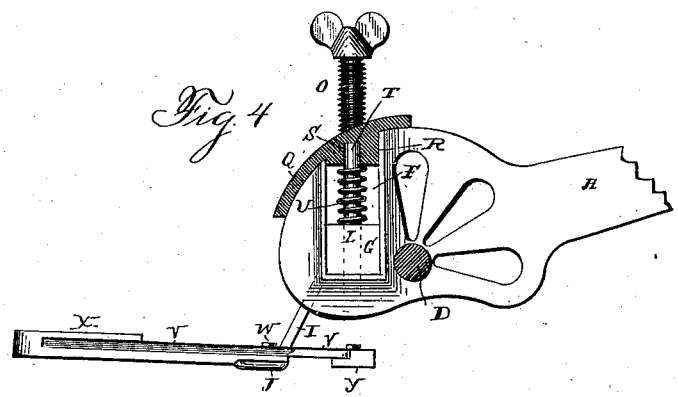
Figure 5:
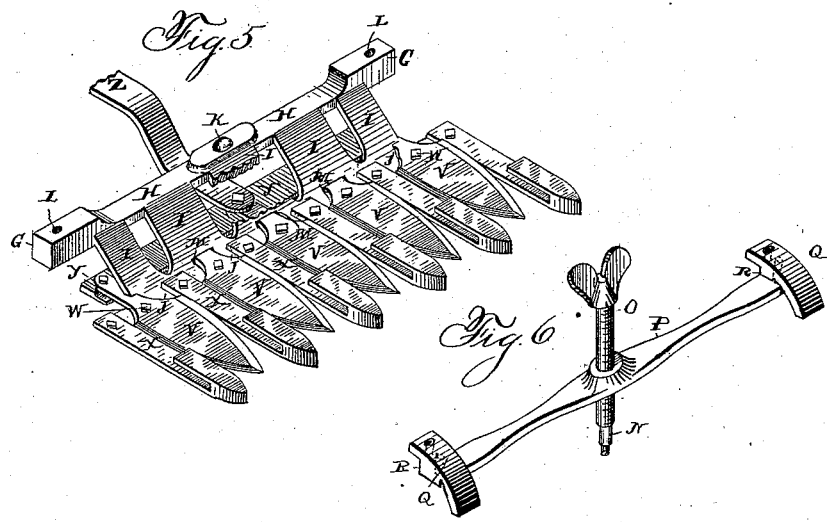
Figure 6:
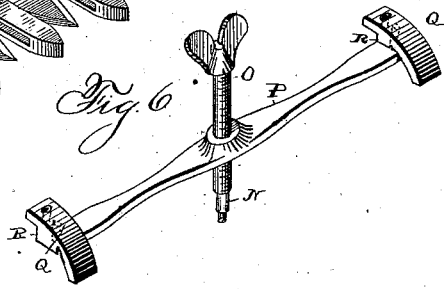

In the accompanying drawings, Figure 1 is a plan view of a lawn-mower embodying my invention, the shield being removed. Fig. 2 is a view thereof in vertical longitudinal section with the shield in place. Fig. 3 is a view, in front elevation, of the forward end of the machine. Fig. 4 is an enlarged broken view, partly in section and partly in side elevation, of the forward end of the frame. Fig. 5 is a detached perspective view of the cutter-carrying frame, showing the knives, knife-guards, the reciprocating bar, and the forward end of the operating-lever; and Fig. 6 is a detached perspective view of the cross-piece.

The side pieces, A A, of the frame of the machine may be of any construction consistent with lightness and strength. In them are journaled the driving-shaft B, carrying the draft-wheels C C, and the shaft D, carrying the small wheels E E, as shown. The forward ends of the said side pieces are provided with open vertical slots F F, receiving the lugs G G of a cutter-carrying frame, as herein shown, made in one piece and having a suspension-bar, H, at the opposite ends of which the said lugs are located, arms or wings I, extending forward and downward from the said suspension-bar, and a cutter bar or bed, J, extending forward and slightly upward from the lower ends of the arms, the said suspension-bar H being provided with a central opening, K, each lug G with a vertical opening, L, and the inner arms, I, with openings M, as shown. The opening K in the suspension-bar H receives the turned end N of a thumb-screw, O, mounted in the center of a cross-piece, P, located directly over the suspension-bar H of the cutter-carrying frame, when the same is in position in the machine, the said carrying-frame being lifted by the screw against a nut, a, located upon the lower end of the same and below the bar H, aforesaid. The opposite ends of the cross-piece P are provided with curved caps Q Q, through which it is secured to the side-pieces, A A, of the frame, and which are provided upon their under faces with lugs R R, entering the open upper ends of the vertical slots F F in the side pieces, A A, and having perforations S S, receiving the upper ends of pins T T, standing upright in the said slots and secured to the said side pieces and passing through the perforations L L of the lugs G G of the cutter-carrying frame, for which they form guides. Springs U U, interposed between the lugs R R and G G and encircling the pins T T, cushion the ends of the cutter-carrying frame and relieve the strain upon the thumb-screw O, by means of which the said frame is vertically adjusted. Knives V are pivoted by bolts W to the bed J of the cutter-carrying frame, the rear ends of the inner knives passing through the apertures M, formed in the inner arms of the cutter-carrying frame, as shown. Knife-guards X are rigidly secured to the said cutter bar or bed J at its ends and alternately between the knives, beyond which they extend. The rear ends of the knives are pivoted to a transverse bar, Y, reciprocated by an operating-lever, Z, the forward end of which is pivoted to the bar midway of the length of the same. The said operating-lever is pivoted by a screw, A', to a plate, B', having a sleeve, C', through which the plate is loosely mounted upon a shaft, D', parallel with the shafts B and D, before referred to. The rear end of the lever is provided with an anti-friction roller, E', and enters the groove F' of a cam, G', centrally mounted upon the driving-shaft B, and constructed to positively throw the lever to the right and left alternately, and thus actuate the bar in transverse reciprocation and operate the knives.

It will be seen from the foregoing description that I have not only provided for the vertical adjustment of the knives, but that I have also provided for a conformable adjustment of the lever operating them.

A rake-head, H', pivoted between the rear ends of the side pieces, A A, of the frame, carries a rake, I', the sides of which are inclined rearwardly away from the machine. The said rake is operated and controlled by a rod, J', connected with the rake-head H' through a staple, K', located therein, extending through blocks L', located upon the lower face of the handle M' of the machine, provided at its upper or outer end with a hook, N', for convenience in manipulating it, and secured in place by a thumb-screw, O', located in the uppermost of the blocks. By means of this rake, which may be readily operated without stopping the mower, the cut grass may be gathered into piles for convenient removal.

A sheet-metal shield, P', is secured to the upper edges of the side pieces, A A, and extends forward over the knives, as shown.

I would have it understood that I do not limit myself to the exact construction shown and described herein, but hold myself at liberty to make such changes and alterations as fairly fall within the spirit and scope of my invention.

Having fully described my invention, what I claim as new, and desire to secure by Letters Patent, is—

1. In a lawn-mower, the combination, with a mower-frame, of a cutter-carrying frame adapted to be vertically adjusted independent of such mower-frame, cutting mechanism carried by the said adjustable frame, a driven cam, and a lever horizontally vibrated by the same for actuating the cutting mechanism, and made vertically adjustable to conform to the vertical adjustments of the independent cutter-carrying frame, substantially as set forth.

2. In a lawn-mower, the combination, with a mower-frame, of a cutter-carrying frame suspended in the forward ends thereof, an adjusting-screw located above the cutter-carrying frame for vertically adjusting the same, and connected with the mower-frame, cutting mechanism carried by the cutter-frame, and driving-connections for such mechanism, made adjustable to conform to the vertical adjustments of the cutter-frame, substantially as set forth.

3. In a lawn-mower, the combination, with a mower-frame having two side pieces and a suspension-piece joining the forward ends of the same, of a cutter-carrying frame suspended in the mower-frame below the said suspension-piece, an adjusting-screw mounted in the suspension-piece and connected with the cutter-carrying frame for vertically adjusting the same, cutting mechanism carried by the cutter-frame, and driving-connections for such mechanism, made adjustable to conform to the vertical adjustments of the cutter-frame, substantially as set forth.

4. In a lawn-mower, the combination, with a mower-frame having two side pieces provided each at its forward end with a vertical slot, of a cutter-carrying frame provided at each end with a lug respectively entering the slots in the mower-frame, a suspension-piece mounted upon the mower-frame and provided at each end with a lug respectively entering the same slots, a screw located in such suspension-piece and connected with the cutter-carrying frame, which is raised and lowered thereby, a horizontally-operated cutting mechanism carried by the cutter-frame, and driving-connections made adjustable to conform to the adjustments of the cutter-frame, substantially as set forth.

5. In a lawn-mower, the combination, with a mower-frame, of a cutter-carrying frame mounted therein and cushioned at each end, a horizontally-operated cutting mechanism carried by the cutter-frame, means for vertically adjusting such frame, and driving-connections for the cutting mechanism, made adjustable to conform to the adjustments of the cutter-frame, substantially as set forth.

6. In a lawn-mower, the combination, with the frame thereof, the same being provided at its forward end with vertical slots, of a cutter-carrying frame provided with a bar having lugs at each end, arms extending downward and forward from such bar, and a cutter bar or bed extending forward from the lower ends of the arms, vibrating knives mounted upon the said cutter bar or bed, and means for vertically adjusting the cutter-carrying frame and operating the knives, substantially as set forth.

7. In a lawn-mower, the combination, with the frame thereof, of an independent cutter-carrying frame mounted in its forward end and made vertically adjustable, knives mounted in the said cutter-carrying frame, a cam centrally located upon the driving-shaft of the machine, an operating-lever operated by such cam and connected with and actuating the said knives and swiveling in a vertical plane to conform to adjustments of the cutter-carrying frame, and means independent of the cutter-carrying frame for supporting such lever, substantially as set forth.

In testimony whereof I have signed this specification in the presence of two subscribing witnesses.

WILLIAM J. FITZGERALD.

Witnesses:
M. S. SEELEY,
C. L. SWAN, Jr.